Nov. 2, 1948.   C. C. COONS   2,452,635
ABSORPTION REFRIGERATING SYSTEM
Filed Sept. 27, 1943
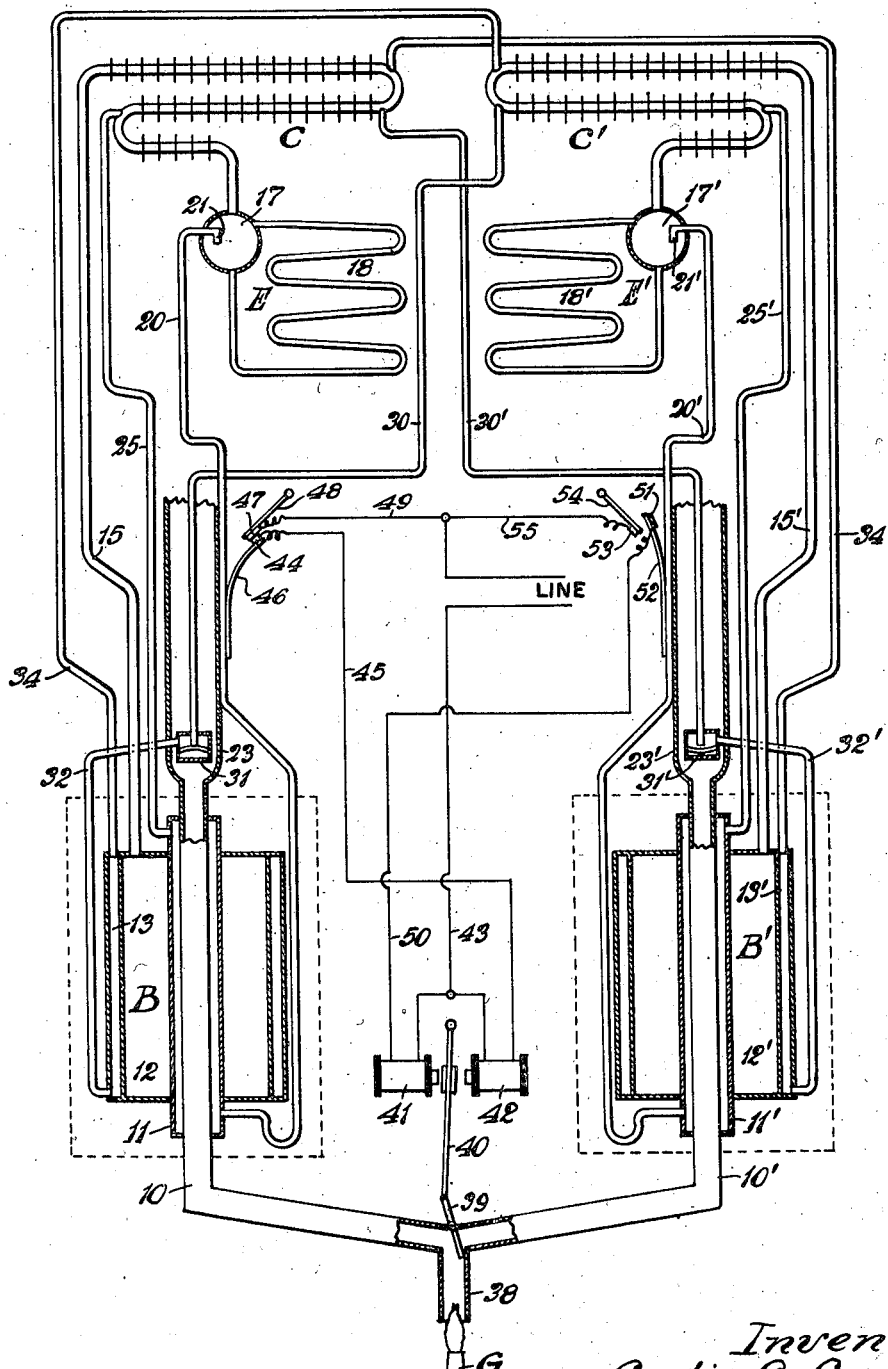
Inventor
Curtis C. Coons
by Harry S. Dumars
Attorney.

Patented Nov. 2, 1948

2,452,635

UNITED STATES PATENT OFFICE 2,452,635

ABSORPTION REFRIGERATING SYSTEM

Curtis C. Coons, North Canton, Ohio, assignor to The Hoover Company, North Canton, Ohio, a corporation of Ohio Application September 27, 1943, Serial No. 503,866

14 Claims. (Cl. 62—5)

This application relates to the art of refrigeration and more particularly to an absorption refrigeration system of the intermittent type including two refrigerating units so designed and co-related with each other in action as to produce substantially continuous refrigeration.

It is a further object of the present invention to provide a refrigerating system of the above described character in which the generator absorbers are cooled on the absorption cycle by the primary refrigerant and in which refrigerant produced by each generator absorber is utilized in part to produce the refrigerating effect, in part to cool the originating generator absorber and in part to cool the associated generator absorber.

It is a further object of the present invention to provide a refrigerating apparatus of the above described character in which the alternately operative cooling units automatically defrost themselves during their non-refrigerating periods whereby to prevent objectionable collection of frost and to maintain high humidity and desirable food storage conditions within the cabinet of the refrigerating apparatus.

It is a further object of the invention to provide a refrigerating system of the above described character in which the generator absorbers are very rapidly cooled to absorbing temperatures at the termination of their generating cycles.

It is a further object of the invention to provide a novel control mechanism for intermittent absorption refrigerating apparatuses.

Other objects and advantages of the invention will become apparent when taken in connection with the accompanying drawing and the following specification in which there is illustrated diagrammatically the refrigerating system according to the invention.

The apparatus consists of a pair of refrigerating units which are substantially identical, hence only the left hand unit will be described in detail, it being understood that the right hand unit is identical and that identical parts are given the same reference characters primed.

The left hand refrigerating unit comprises an absorber-generator B, a tubular air cooled condenser C and an evaporating unit E suitably connected by various conduits to be described hereinafter.

The absorber-generator B consists of an inner heating flue 10, an annular cooling jacket 11 surrounding the flue 10, an annular space 12 adapted to contain the absorbent and an outer annular cooling jacket 13.

The space 12 containing the absorbent, preferably a dry salt such as strontium chloride and the like, will preferably contain a plurality of metal trays upon which the pulverized salt rests in the manner taught for example in British Letters Patent 530,061, complete specification accepted December 4, 1940.

The apparatus is charged with a suitable, preferably solid, absorbent, such as strontium chloride and the like, and with a refrigerant which is readily absorbable by the absorbent, such as ammonia. These substances are specified by way of example only, as numerous other combinations suitable for use in refrigerating apparatuses of the general type here under consideration are known to the art.

The salt containing chamber 12 of the absorber-generator B communicates at its upper portion with the upper portion of the tubular air cooled condenser C by means of a conduit 15. The condenser C at its lower portion discharges into a collection chamber 17 of the evaporator E. The evaporator E also includes one or more refrigerant passageways 18 which are connected at their upper and lower ends to the chamber 17 so that refrigerant liquid may flow from the bottom of the chamber 17 into the lower portion of the passageway 18 and evolved vapor and unevaporated refrigerant be returned to vessel 17 by vapor lift action in the passageway 18.

A syphon conduit 20 opens into the vessel 17 and includes a downwardly facing inlet leg 21 arranged to charge the syphon 20 when substantially all the absorbed refrigerant normally active in the system has been evolved from the salt in chamber 12 and condensed in the condenser C. The conduit 20 extends downwardly along an upper enlarged portion 23 of the flue 10 and then communicates with the lower end of the inner cooling jacket 11 of the generator absorber structure. The upper portion of the jacket 11 communicates with a conduit 25 which is arranged to convey vapor produced in jacket 11 back to condenser C.

A conduit 30 is connected to condenser C' and positioned to drain away therefrom refrigerant condensed in the upper portion of the condenser C and to conduct this liquid to the lower portion of the outer cooling jacket 13 of the generator-absorber B. The conduit 30 extends through the enlarged extension 23 of the products of combustion flue and includes a snap acting thermostatic valve mechanism 31, such as a "Klixson" valve, which when heated will close off the end of conduit 30. A conduit 32 is arranged to conduct liquid from the valve structure 31 to the lower end of the jacket 13 of the generator-absorber B. A conduit 34 is connected to convey evolved vapor from the upper portion of the jacket 13 to the upper portion of condenser C'.

The right hand refrigerating system is identical with that described immediately above, it being noted that conduits 30' and 34' communicate with condenser C in the same manner in which conduits 30 and 34 communicate with condenser C' and for the same purpose.

Heat is supplied to the apparatus from any suitable source such as a combustible fuel burner G which discharges into a duct 38. The duct 38 opens into the joined lower ends of conduits 10 and 10' at which point there is provided a suitable valve 39 designed to direct the products of combustion into flues 10 or 10' as may be required by the particular operating phase of the apparatus.

The valve 39 is actuated by an armature 40 positioned between solenoids 41 and 42. The solenoids 41 and 42 are connected to one line of a suitable source of energy by electrical conductor 43. Solenoid 42 connects to a contact 44 by conductor 45. The contact 44 is mounted upon the upper base of and insulated from a suitable bi-metallic thermostatic element 46 which is supported by and is responsive to the temperature of that portion of conduit 20 which is in heat exchange relationship with flue extension 23. A complementary electrical contact 47 is mounted upon the lower face of and insulated from a flexible supporting strip 48. The contact 48 is connected to the source of electrical energy by a conductor 49.

Solenoid 41 is connected in a similar circuit in which the elements designated by reference characters 50, 51, 52, 53, 54 and 55 correspond respectively to the elements 45, 44, 46, 47, 48 and 49, respectively, associated with solenoid 42. The bimetallic element 52 is in thermal contact with and supported by that portion of conduit 20' which lies in heat exchange relationship with the extension 23' of products of combustion flue 10'.

The operation of the apparatus is as follows: As illustrated, the absorber generator B has substantially completed its heating cycle and refrigerant liquid has collected in vessel 17 to a height sufficient to charge the syphon conduit 20, 21.

Upon charging of the syphon conduit 20 liquid refrigerant flows therethrough into that portion in heat exchange with the flue 23 and thermostatic strip 46. This produces sudden cooling of thermostat 46 which is aided by evaporation of liquid in that portion of conduit 20 in heat exchange with the thermostatic strip 46. Cooling of the thermostatic strip 46 causes it to flex to the left which establishes an electrical connection between the electrical contacts 44 and 47. Establishment of the electrical circuit of contacts 44 and 47 energizes solenoid 42 which will shift the flame deflecting valve 39 to discontinue heating of the boiler B and to apply heat to the generator-absorber B'.

The contact made between electrical contacts 44 and 47 is only of short duration; that is, a period of time sufficient to allow the solenoid 42 to shift the flame deflecting valve 39 to direct the products of combustion to the boiler B'. Continued cooling of the thermostatic strip 46 by reason of the refrigerant liquid flowing through conduit 20 causes the same to snap past the flexible support 48 away from contact 47 and to open the electrical circuit to the solenoid 42.

The rush of liquid through conduit 20 into the jacket 11 produces very rapid initial cooling of the absorbent in the generator-absorber B with resulting evolution of refrigerant vapor which returns to the condenser through conduit 25 for recondensation and is returned to the evaporator. This initial cooling of the salt in the generator-absorber B very quickly lowers the temperature thereof, refrigerant vapor begins to absorb in the generator-absorber B and the liquid level in the evaporator E is lowered so as no longer to charge the syphon conduit 20 which then becomes inactive.

When heat is applied to the generator-absorber B' the thermostatic valve 31' immediately closes and shuts off the connection between conduits 30' and 32' to discontinue supply of cooling medium to the outer cooling jacket 13'.

When heat is first supplied to the absorber-generator B' the thermostatic element 52 is in the position illustrated. However, as the temperature thereof is raised by reason of the products of combustion flowing through the flue 23', the free end thereof gradually flexes downwardly away from conduit 23'. In course of this flexure it strikes and passes by the flexible support 54 for the contact 53. However, no electrical circuit is made as the portions of the elements 52 and 54 which make contact are insulated from the electrical connections.

The flame very quickly raises the temperature of the charged absorbent in the generator absorber B' and refrigerant vapor is evolved from the charged absorbent. This vapor then flows through conduit 15', is condensed in condenser C' and flows into the evaporator E' collecting in the coil 18' and vessel 17'. A part of the refrigerant condensed in the upper portion of condenser C' flows through conduit 30, valve chamber 31, which is now open due to the lowering of its temperature as a result of the shifting of the hot products of combustion to the opposite generator-absorber, and flows through conduit 32 into the outer cooling jacket of the generator-absorber B. This liquid refrigerant circulating in the cooling jacket 13 picks up the heat of absorption produced in the generator-absorber B and vaporizes. The vapor flows through conduit 34 to condenser C' wherein it is again condensed to the liquid state.

During this period the boiler B is absorbing vapor produced in evaporator E, thus producing a useful refrigerating effect while refrigerant liquid is being stored in the evaporator E'.

This apparatus advantageously utilizes the differences in thermal properties between the refrigerant and the refrigerant salt combination to effect refrigeration and cooling of the absorber-generators with the same fluid. For example, if strontium chloride is utilized as the absorbent and ammonia as the refrigerant the vaporization temperature of pure liquid ammonia at the condensing pressure of the apparatus is within the temperature range to which the strontium chloride must be cooled to absorb ammonia vapor at pressures sufficiently low to produce low temperature evaporation of the ammonia in the evaporator. Therefore the high pressure liquid ammonia flowing from the condenser to the cooling jackets of an absorber-generator will be vaporized in the cooling jackets at temperatures low enough to induce the strontium chloride to absorb ammonia vapor from the evaporators at a low pressure and temperature.

Each individual unit of the system operates automatically to shut off the supply of heat to itself, to shift the heat to the associated unit, to cool the absorbent very rapidly in order to bring it quickly to an absorbing temperature and to supply the principal refrigerating medium for the principal cooling of the associated generator-absorber.

It is to be noted that the system contains no moving parts internally thereof excepting only the small "Klixson" valves 31, 31' and that the various cooling steps proceed automatically without intervention from the control, again excepting only the "Klixson" valves.

The apparatus has been illustrated diagrammatically. In actual use it will preferably be associated with a cabinet structure provided with an insulated refrigerating chamber receiving the evaporators and with a suitable machinery compartment housing the absorber-generators and condenser and arranged for flow of cooling air therethrough.

While only one embodiment of the invention has been shown and described herein, it is apparent that various changes may be made in the arrangement and construction of parts without departing from the spirit of the invention or the scope of the annexed claims.

I claim:

1. That method of producing refrigeration utilizing absorber-generators operating alternately on the absorbing and generating phases, which includes the steps of quickly cooling the absorber-generators at the ends of their generating phases with refrigerant evolved from the generator-absorbers to be cooled and subsequently continuing cooling of the absorber-generator operating on the absorbing phase with refrigerant evolved in the associated absorber-generator.

2. That method of producing refrigeration utilizing a plurality of absorber-generators operating alternately on absorbing and generating phases, which includes the steps of cooling each absorber-generator quickly to a low absorbing temperature by passing liquid refrigerant produced by said absorber-generator into heat exchange relation therewith and subsequently removing the heat of absorption from said absorber-generator by passing coolant from a different source in heat exchange therewith.

3. That method of producing refrigeration utilizing an absorber-generator operating alternately on absorbing and generating phases, which includes the steps of passing refrigerant produced by the said absorber-generator in liquid phase in heat exchange relation with the said absorber-generator to reduce the temperature thereof quickly to a value sufficiently low to promote absorption and subsequently passing other liquid in heat exchange with the said absorber-generator to remove the heat of absorption therefrom.

4. In a refrigerating apparatus; a pair of intermittent absorption refrigerating systems each comprising an absorber-generator, a condenser and an evaporator connected for circulation of refrigerant; means for quickly chilling the absorber-generator of each system at the end of its generating phase of operation by flowing refrigerant liquid produced by the absorber-generator to be cooled in heat exchange relation therewith, and means for subsequently cooling each absorber-generator by flowing refrigerant liquid produced by the other refrigerating system in heat exchange relation therewith.

5. Refrigerating apparatus comprising a pair of refrigerating systems each including an absorber-generator, a condenser in open communication with said absorber-generator and an evaporator in open communication with said condenser, means constructed and arranged to cool each of said absorber-generators quickly at the end of the generating period thereof by flowing refrigerant liquefied in the condenser of the system containing such absorber-generator in heat exchange with such absorber-generator, and means constructed and arranged to cool each absorber-generator subsequent to the initial cooling thereof by flowing refrigerant liquefied in the condenser of the other refrigerating system in heat exchange relation therewith.

6. In a refrigerating apparatus; a pair of refrigerating systems each comprising a generator-absorber, a condenser and an evaporator connected for circulation of refrigerant; each of said evaporators including a refrigerant liquid collecting vessel, means associated with each of said refrigerating systems for withdrawing refrigerant liquid from said collecting vessel of each system and for conducting the liquid into heat exchange relation with the generator-absorber of the same system to cool the generator-absorber quickly, and means associated with each of said systems for conducting refrigerant liquid from the condenser thereof into heat exchange relation with the absorber-generator of the other refrigerating system.

7. In a refrigerating apparatus; a pair of refrigerating systems each comprising a generator-absorber, a condenser and an evaporator connected for circulation of refrigerant; each of said evaporators including a refrigerant liquid collecting vessel, means associated with each of said refrigerating systems for withdrawing refrigerant liquid from said collecting vessel thereof and for conducting the liquid into heat exchange relation with the generator-absorber thereof to cool the generator-absorber quickly and for returning the refrigerant to the condenser of the same system, and means associated with each of said systems for conducting refrigerant liquid from the condenser thereof into heat exchange relation with the absorber-generator of the other refrigerating system and for returning the refrigerant to the condenser in which it originated.

8. Refrigerating apparatus comprising a pair of absorber-generators, a pair of condensers each in open communication with an associated absorber-generator, a pair of evaporators each including a collecting vessel in open communication with an associated condenser, syphon means associated with each evaporator arranged to withdraw liquid from the collecting vessel and to flow the liquid into heat exchange relation with the associated absorber-generator until the level of the liquid in the collecting vessel drops below a predetermined minimum, means for conducting refrigerant withdrawn from the collecting vessel from the absorber-generator to the condenser in which such refrigerant was originally liquefied, means for heating said absorber-generators, and means responsive to a condition produced by withdrawal of refrigerant from each collecting vessel for discontinuing the supply of heat to the absorber-generator of the system including such collecting vessel and for initiating heating of the other absorber-generator.

9. Refrigerating apparatus comprising a pair of absorber-generators, a pair of condensers each in open communication with an associated absorber-generator, a pair of evaporators each including a collecting vessel in open communication with an associated condenser, syphon means associated with each evaporator arranged to withdraw liquid from the collecting vessel and to flow the liquid into heat exchange relation with the associated absorber-generator until the level of the liquid in the collecting vessel drops below a predetermined minimum, means for conducting refrigerant withdrawn from the collecting vessel from the absorber-generator to the condenser in which such refrigerant was originally liquefied, means for heating said absorber-generators, means responsive to a condition produced by withdrawal of refrigerant from each collecting vessel for discontinuing the supply of heat to the absorber-generator of the system including such collecting vessel and for initiating heating of the other absorber-generator, and means for conducting refrigerant liquid from the condenser communicating with the heated absorber-generator in heat exchange relation with the other absorber-generator and for returning such refrigerant to the condenser from which it was withdrawn.

10. Refrigerating apparatus comprising a pair of absorber-generators, a pair of condensers each in open communication with an associated absorber-generator, a pair of evaporators each including a collecting vessel in open communication with an associated condenser, syphon means associated with each evaporator arranged to withdraw liquid from the collecting vessel and to flow the liquid into heat exchange relation with the associated absorber-generator until the level of the liquid in the collecting vessel drops below a predetermined minimum, means for conducting refrigerant withdrawn from the collecting vessel from the absorber-generator to the condenser in which such refrigerant was originally liquefied, means for heating said absorber-generators, means responsive to a condition produced by withdrawal of refrigerant from each collecting vessel for discontinuing the supply of heat to the absorber-generator of the system including such collecting vessel and for initiating heating of the other absorber-generator, means for conducting refrigerant liquid from the condenser communicating with the heated absorber-generator in heat exchange relation with the other absorber-generator and for returning such refrigerant to the condenser from which it is withdrawn, and means in said conducting means operable to close the same to flow of fluid therethrough when the absorber-generator to which refrigerant fluid is conducted by said conducting means is being heated.

11. In a refrigerating apparatus, a pair of generator-absorbers operative alternately on generating and absorbing phases, a pair of condensers each in open communication with one of said generator-absorbers, a pair of evaporators each in open communication with one of said condensers, means for applying heat to each of said generator-absorbers during the generating phase thereof, means for conducting refrigerant liquid in heat exchange with each generator-absorber from the condenser not in open communication with the said generator-absorber, and thermostatic means for preventing flow of refrigerant liquid through said conducting means when the absorber-generator in heat exchange therewith is being heated.

12. In a refrigerating apparatus; a pair of refrigerating systems; each of said systems comprising a generator-absorber, a condenser and an evaporator in open communication, means for cooling the generator-absorber comprising a part in heat exchange relation therewith and means forming a path of flow of refrigerant including said evaporator, said part in heat exchange relation with said absorber-generator and said condenser, and a second part in heat exchange relation with said generator-absorber; and means forming a second path of flow of refrigerant for cooling the generator-absorbers of each system including said second part in heat exchange relation with the generator-absorber of each system and the condenser of the other refrigerating system.

13. Refrigerating apparatus comprising a pair of refrigerating systems each including an absorber-generator, a condenser in open communication with said absorber-generator and an evaporator in open communication with said condenser, means constructed and arranged to cool each of said absorber-generators quickly to an absorbing temperature at the end of the generating period thereof and to dissipate the heat of the absorber-generator undergoing cooling from its associated condenser, and means for subsequently dissipating the heat of absorption produced in said absorber-generator from the condenser of the other refrigerating system.

14. That method of producing refrigeration utilizing an absorber-generator operating alternately on absorbing and generating phases, which includes the steps of liquefying refrigerant vapor evolved from said absorber-generator when operating on the generating phase, collecting the liquefied refrigerant, flowing a portion of such collected liquid in heat transfer relation with said absorber-generator to reduce the temperature thereof quickly to initiate the absorbing phase of said absorber-generator, and subsequently removing the heat of absorption from said absorber-generator by flowing a cooling liquid into heat exchange relation therewith.

CURTIS C. COONS.

REFERENCES CITED

The following references are of record in the file of this patent:

UNITED STATES PATENTS

| Number | Name | Date |
|---|---|---|
| 1,770,607 | Ferguson | July 15, 1930 |
| 1,908,413 | Elfving | May 9, 1933 |
| 2,257,735 | Kleen | Oct. 7, 1941 |
| 2,276,948 | Kleen | Mar. 17, 1942 |